(No Model.)
C. P. HOWELL.
NUT LOCK.
No. 510,023. Patented Dec. 5, 1893.
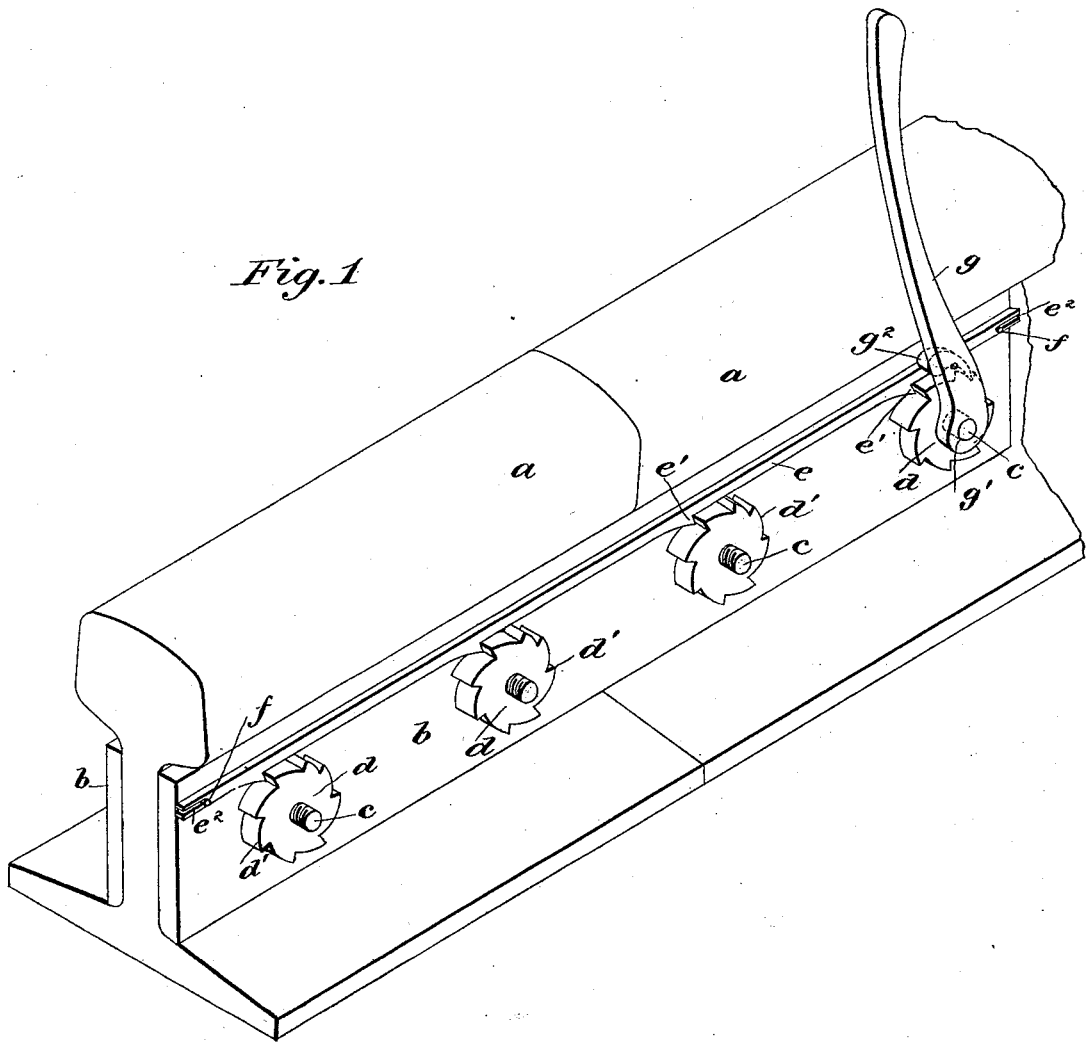
Fig. 1
Fig. 2
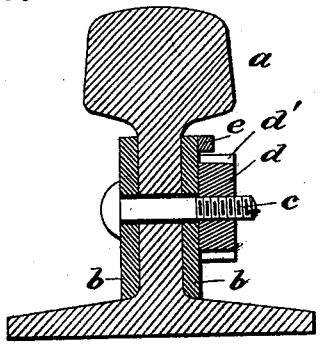
Witnesses
Inventor:
Commodore P. Howell,
by W. H. Fincrel
att'y.

UNITED STATES PATENT OFFICE.

COMMODORE P. HOWELL, OF CHATTANOOGA, TENNESSEE.

NUT-LOCK.

SPECIFICATION forming part of Letters Patent No. 510,023, dated December 5, 1893.

Application filed September 16, 1893. Serial No. 485,695. (No model.)

*To all whom it may concern:*

Be it known that I, COMMODORE P. HOWELL, a citizen of the United States, residing at Chattanooga, in the county of Hamilton and State of Tennessee, have invented a certain new and useful Improvement in Nut-Locks, of which the following is a full, clear, and exact description.

The object of this invention is to provide a nut lock in which the nut may be run on and off freely as occasion requires, and which will resist working off under ordinary conditions of service.

The invention is specially applicable to fish-plates for railways although it is useful in other connections.

The invention consists in a nut lock comprising a number of nuts, each nut having a ratchet-like periphery, and all of the nuts being screwthreaded to turn in one and the same direction, combined with a spring-bar which is arranged upon a support outside of or apart from the nuts and their bolts, such as a fish-plate in a rail-joint, such spring-bar having as many clicks or detents as there are nuts to be locked and being adapted to engage the ratchets of the nuts and permit the nuts to be freely rotated to turn them home, and which prevent the reverse rotation of the nuts and hence their working off under service, the said spring-bar having a yielding or movable connection with its support so as to admit of its being sprung away from the nuts and thereby permit the disengagement of the clicks or detents from the nuts when it is desired to remove the nuts.

In the accompanying drawings illustrating my invention, in the two figures of which like parts are similarly designated, Figure 1 is a perspective view of my nut lock applied to a railroad rail joint, and Fig. 2 is a cross-section.

The rails $a, a$, may be of ordinary construction as also may be the fish-plates $b, b$, and the bolts $c$, the rails and the fish-plates being provided as usual with holes for the passage of the bolts through them. The several nuts $d$ are adapted to screw onto the bolts in one and the same direction and are provided with the peripheral teeth or spurs $d'$ by which they may be rotated or turned onto the bolts. In order to lock these nuts in given position, I provide a click or detent bar $e$, having the depending teeth or spurs $e'$ running in a reverse direction to the teeth or spurs on the nuts. This bar is made of metal or other substance or material which will yield against the pressure of the rotating nut when being screwed home to permit the teeth or spurs of the nut to pass its teeth or spurs, and thereafter cause its teeth or spurs to engage the shouldered ends of the teeth or spurs of the nut to resist rotation of the nut in the reverse direction. In order to fix the click or detent bar in position and at the same time give it proper play, I slot its ends, as at $e^2$, and pass bolts, rivets, pins or other fastenings $f$ through such slots into the fish-plate and secure them in the latter. It will be observed that no alteration of the fish-plate is necessary in order to receive my spring-bar.

It is obvious that the nut may be turned home freely, and it will be apparent that should it be necessary, as it is frequently, to turn off the nuts, this may be readily done by lifting the detent out of the nut without injury to the detent or nut.

A suitable wrench for turning on the nuts is shown, and it consists of a handle bar $g$ having an eye $g'$ by which it may be fitted to the projecting end of the bolt, which will serve as a fulcrum, and a click or pawl $g^2$ to engage the teeth or spurs of the nut, so that by rotating or vibrating the handle bar, the nut may be turned home by a step-by-step engagement of the click $g^2$ with the teeth of the nut.

Thus it will be seen, that in principle and operation my nut lock is a ratchet, and I so term it.

Of course it is within my invention to use other means than the described wrench for operating the nut, and it is also within my invention to provide a square projection on the nut to adapt it for use in connection with the ordinary monkey wrench.

What I claim is—

1. A ratchet nut lock, comprising screwthreaded nuts each having its periphery provided with teeth or spurs and all screwthreaded to turn in one and the same direction, and a spring-bar yieldingly sustained at its ends upon a suitable support outside of the nuts and their bolts, and having as many clicks or detents as there are nuts, to engage the teeth or spurs of the nuts, and adapted to be sprung out of engagement with the nuts, substantially as described.

2. A ratchet nut-lock, comprising screw-threaded nuts, each having its periphery provided with teeth or spurs, and all screwthreaded to turn in one and the same direction, and a spring-bar having its ends slotted and yieldingly fitted by fastenings to a support outside of the nuts and their bolts, and having as many clicks or detents as there are nuts, to engage the teeth or spurs of the nuts, the said bar being adapted to be sprung up to disengage the clicks or detents from the nuts to permit the nuts to be run off, substantially as described.

3. The combination of the meeting ends of railroad rails, fish-plates applied on opposite sides thereof, ordinary screwthreaded bolts passed through holes in the fish-plates and rails, and nuts screwed on to said bolts and having their peripheries provided with teeth or spurs, and a spring-bar yieldingly applied by its ends to one of the fish-plates and having clicks or detents to engage the teeth or spurs of the nuts and restrain them from running off, the said bar being adapted by its yielding or movable connection with the fish-plate to be sprung away from the nuts to carry its clicks or detents out of engagement with such nuts, substantially as described.

In testimony whereof I have hereunto set my hand this 16th day of September, A. D. 1893.

COM. P. HOWELL.

Witnesses:
WM. H. FINCKEL,
CHARLES N. LARNER.